United States Patent

Bresolin et al.

Patent Number: 5,859,411
Date of Patent: Jan. 12, 1999

[54] COMPACT IMMERSION HEATER, PARTICULARLY FOR AQUARIUMS

[75] Inventors: Valerio Bresolin, Pove del Grappa; Daniele Ragazzon, Borso del Grappa, both of Italy

[73] Assignee: Hydor S.R.L., Italy

[21] Appl. No.: 737,393

[22] PCT Filed: May 8, 1995

[86] PCT No.: PCT/EP95/01733

§ 371 Date: Feb. 21, 1997

§ 102(e) Date: Feb. 21, 1997

[87] PCT Pub. No.: WO95/31882

PCT Pub. Date: Nov. 23, 1995

[30] Foreign Application Priority Data

May 11, 1994 [IT] Italy .................................. VI94A0068

[51] Int. Cl.⁶ .................................................. H05B 3/06
[52] U.S. Cl. ......................... 219/523; 219/544; 219/546; 392/501
[58] Field of Search .................. 219/544, 546, 219/331; 392/501

[56] References Cited

U.S. PATENT DOCUMENTS

| | | |
|---|---|---|
| 3,319,049 | 5/1967 | Ulanet . |
| 3,803,386 | 4/1974 | Rodriquez . |
| 4,379,220 | 4/1983 | Middleman ............................ 219/331 |
| 4,994,780 | 2/1991 | McQueen ................................ 219/544 |
| 5,220,154 | 6/1993 | Gunther ................................... 219/544 |
| 5,389,184 | 2/1995 | Jacaruso .................................. 219/544 |
| 5,598,502 | 1/1997 | Takahashi ............................... 219/544 |
| 5,633,978 | 5/1997 | Hofsass ................................... 392/501 |

FOREIGN PATENT DOCUMENTS

| | | |
|---|---|---|
| 0 460 298 | 12/1991 | European Pat. Off. . |
| 0 543 655 | 5/1993 | European Pat. Off. . |
| 29 27 280 | 1/1981 | Germany . |

*Primary Examiner*—Teresa J. Walberg
*Assistant Examiner*—Quan Nguyen
*Attorney, Agent, or Firm*—R. Neil Sudol; Henry D. Coleman

[57] ABSTRACT

A compact immersion heater, for aquariums, includes: a watertight tubular container (2); an electric heating component (4); an adjustable thermostat (3); an electric circuit (6, 7, 8, 9) for connecting the heating component, arranged in series to the thermostat, to an external electric power source. The heating component is mounted in a radially offset and longitudinally superimposed position with respect to the thermostat and is accommodated in a torus-like gap formed between the thermostat and the inside surface of the container. The heating component is a resistive component having a laminar structure formed by a layer (16) of an electrically resistive material that is anchored to an electrically insulating and heat-resistant flexible laminar support (15). The layer of resistive material is a PTC ink that is printed onto the support in selected regions (17) that are connected to paths that conduct the electric power supply, directly face the sensitive part of the thermostat, and are adjacent to it.

12 Claims, 3 Drawing Sheets

COMPACT IMMERSION HEATER, PARTICULARLY FOR AQUARIUMS

The present invention relates to a compact heater particularly but not exclusively for aquariums. The heater according to the invention can also be used in other technical fields, such as in photographic studios and laboratories, where it is necessary to heat a certain volume of liquid and keep it at a substantially constant temperature.

Conventional heaters are generally constituted by a tubular glass container that is shaped like a test-tube and internally accommodates three essential components, namely: an electric heating component, which is series-connected to a thermostat; an electric circuit for connecting the heating component to an external source of electric power; and a thermostat regulator that can be accessed from outside by a user.

Examples of heater of the type mentioned above are described in U.S. Pat. Nos. 3,895,217, 4,072,847, 4,124,793, 4,149,067, 4,225,648, and 4,812,626, in Swiss patent no. 269723, in European patents Nos. 0 022 149 and 0 247 676, and in Italian utility model applications Nos. 6194B/85 and 30694 B/86.

In all this prior art, the heating component is generally constituted by an electric resistor that is accommodated in the lower part of the container, whereas the thermostat is formed by a sensitive part that includes a bimetallic strip mounted on an appropriate support which is located in the upper part of the test-tube.

The electric resistor is kept at a certain distance from the glass wall of the test-tube, generally more than a millimeter, in order to protect it against thermal shocks and to comply with safety rules regarding electrical devices in contact with liquids.

This conventional arrangement produces a series of drawbacks.

First of all, heat exchange between the water and the resistor occurs only by convection and irradiation, consequently limiting the thermal efficiency of the device. Furthermore, in order to dissipate significant power levels it is necessary to create very steep thermal gradients, on the order of a few hundred degrees Celsius, consequently raising the maximum temperature of the device.

For closing the circuit, the bimetallic strip is calibrated when the resistor is not powered and is therefore actually sensitive to the temperature of the water.

Due to the longitudinal displacement of the heating component with respect to the thermostat, part of the heat produced by the heating component unavoidably flows upward into the thermostat, and therefore the circuit opens not so much in response to the temperature of the heated medium but due to the heat that originates directly from the resistor. The circuit opens at a temperature that is a few degrees higher than the closure temperature, typically by about ten degrees. This interval can be controlled by a magnet-fitted contact that attracts an iron plate located at the end of the bimetallic strip. The magnet retains the contact until the strip has curved beyond a certain limit, which can be adjusted at will with various systems, correspondingly varying the opening temperature.

If opening were due only to the heat from the water, the temperature of the heated medium would oscillate over a wide range between the closing and opening temperatures of the bimetallic strip. Since the bimetallic strip is instead affected directly by the temperature of the heating system, the temperature of the water oscillates between the closure temperature of the bimetallic strip and a slightly higher one. This temperature gets closer to the closure temperature as the flow of heat, from the resistor to the bimetallic strip, increases. In extreme cases, the bimetallic strip opens and closes the circuit continuously, since the heat supplied by the resistor tends to deform the strip immediately. In this manner one would obtain excellent temperature control, but an extremely long time would be needed to heat the water and the number of opening and closing actions would become excessive and would shorter the life of the contacts. In order to prevent this phenomenon, in practice a thermally insulating part, or heat shield, is interposed between the heating component and the thermostat by inserting it in an intermediate position in the test-tube, in order to limit the flow of heat toward the thermostat.

This arrangement causes the total length of heaters to be at least equal to the sum of the lengths of the individual components, that is to say, of the thermostat, of the heat shield, and of the heating component. This greater bulk is an evident limitation, especially for shallow-bed aquariums used for example for small turtles.

Another drawback of known devices is that it is difficult to adjust the thermostat because its sensitive part is affected by a high-temperature heat source that is intrinsically difficult to control. Furthermore, as the power level of the heating system varies, so does the power level transmitted to the sensitive part, and it is therefore necessary to correspondingly calibrate the distance between the magnet and the sensitive double strip by means of a screw that adjusts the relative distance of the contacts by acting on the position of one of the two. This is the only way to make sure that the time interval between contact opening and closure is constant although the power level varies. In practice, it is necessary to provide thermostats with different calibrations to cover all the power ranges.

Another drawback is the fact that the resistor operates at high temperature and therefore cannot be placed directly in contact with the glass to prevent breakages caused by thermal shock and in order to comply with safety rules, which mandate double electric and thermal insulation.

Accordingly, conventional resistors must be spaced from the inside surface of the test-tubes by adequate supports, made for example of steatite, that are considerably expensive.

Finally, it is noted that conventional heaters have a rather complicated and expensive structure, also because of the presence of scales and labels that must be mounted in preset positions with entirely manual methods.

From document EP-A-0 460 298 an electric immersion heater is known having all the features mentioned in the preamble of Claim 1. A heating element and a thermostat are arranged in seaprate chambers formed within the glass container thus increasing the overall length of such known immersion heater.

From document DE-A-29 27 280 an immersion heater is known having also two internal chambers each respectively occupied by a heating element and a thermostat adjustable from the outside. A second thermostat for cutting current in case of overheating is placed inside the heating element and has a smaller length than this latter, Also this known immersion heater has a considerable overall length.

The aim of the present invention is to obviate the above mentioned drawbacks by providing in general a heater that is compact, reliable, and safe.

A particular object is to provide a heater whose total length is less than that of conventional commercially available heaters for an equal outside diameter, so that is can be easily used even for shallow beds.

Another object is to provide a heater with a better thermal efficiency than previous ones.

Another object is to provide a heater that operates at low temperature so as to increase its inherent safety.

Another object is to provide a heater that has a relatively simple and cheap structure.

This aim, these objects, and others are achieved by a heater according to claim 1.

The dependent claim illustrate particular embodiments of the heater according to the invention.

By virtue of the fact that the glass container defines a unitary internal space, that is occupied by both the thermostat and the heating element, that the heating component is longitudinally superimposed and radially offset with respect to the thermostat, the total length of the heater is approximately equal to the length of the longest component.

The arrangement of the heating component around the thermostat improves the sensitivity of the device and its thermal efficiency.

Furthermore, the use of a laminar heating component that is forced against the inside surface of the container increase. thermal efficiency and reduces electric power consumption.

The safety of the device is further increased by the use of a PTC heater with a bottom layer that has high thermal conductivity and low electrical conductivity.

Further characteristics and advantages will become apparent from the detailed description of a preferred embodiment of a heater according to the invention, illustrated only by way of non-limitative example in the accompanying drawings, wherein.

Figure 1:
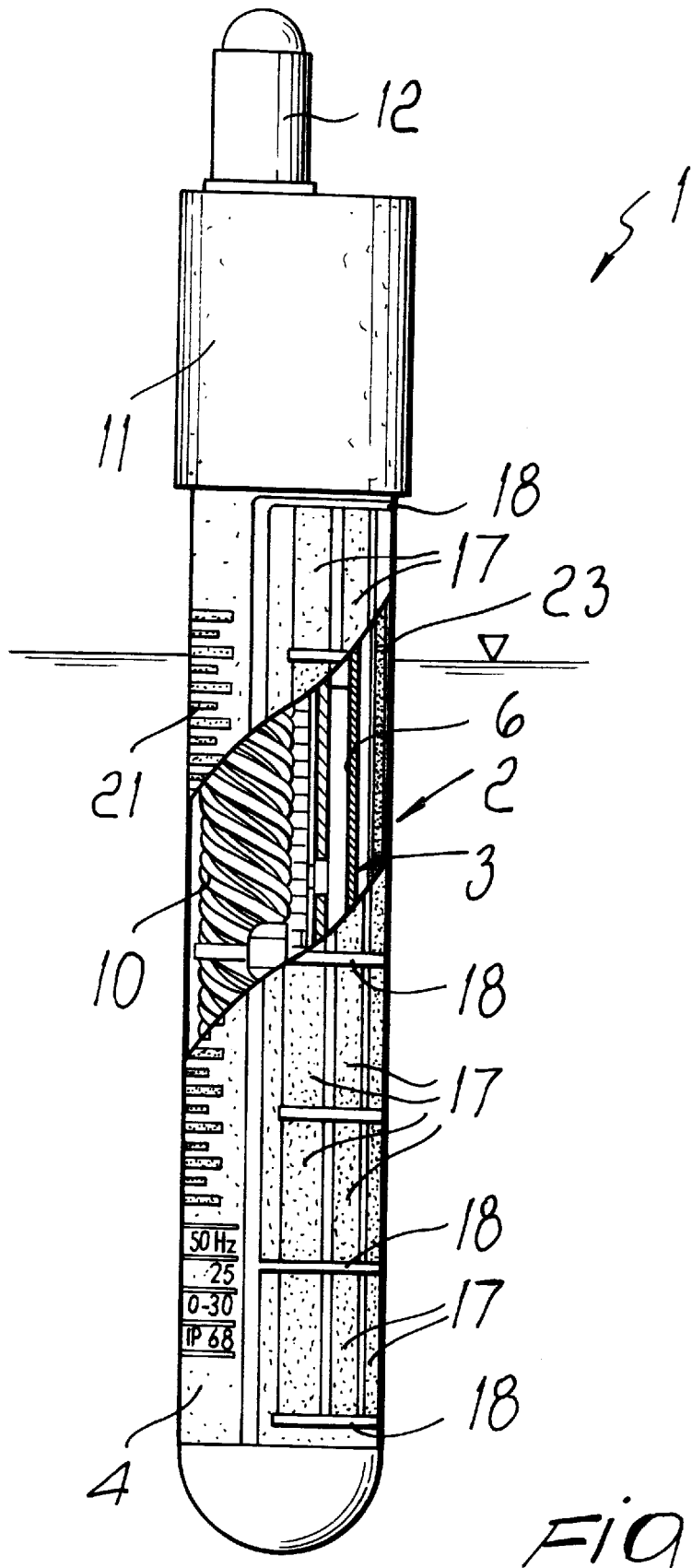
FIG. 1 is a partially sectional side view of a heater according to the invention, immersed in a liquid.

With reference to the above figures, a heater according to the invention, generally designated by the reference numeral 1, includes an outside container 2 that is shaped like a test-tube ampoule provided with a bulb, inside which a thermostat 3 and a heating component 4 are accommodated.

The shape and structure of the thermostat 3 generally correspond to those illustrated and described in European patent application no. 0 460 298 in the name of this same Applicant.

In the illustrated example, the thermostat 3 is of the two-strip type and includes a frame 5 made of heat-resistant synthetic material that supports, on one side, an elongated bimetallic strip 6 that constitutes the part that is sensitive to temperature variations.

Figure 2:
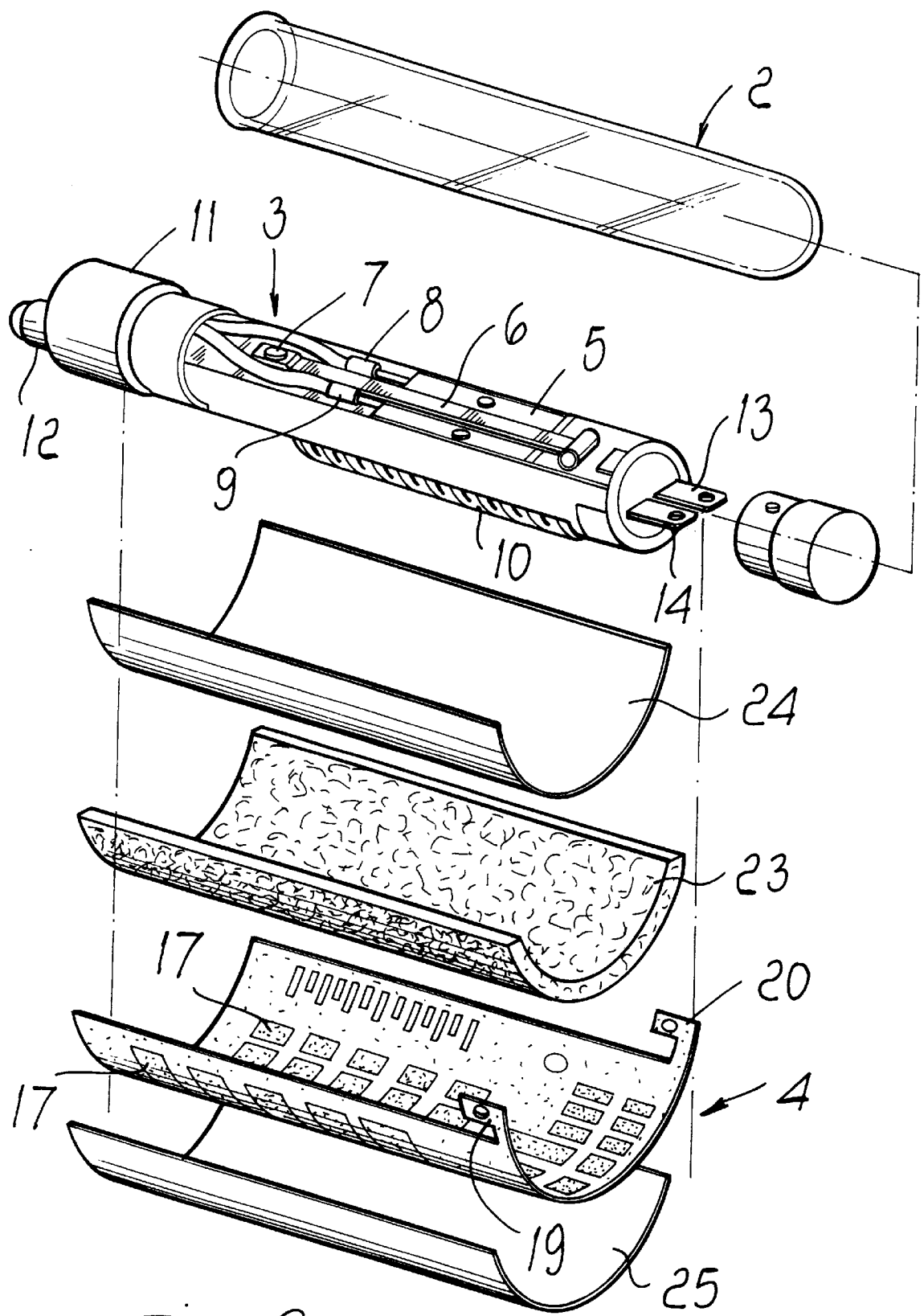
FIG. 2 is a general exploded perspective view of a heater according to the invention.
Figure 3:
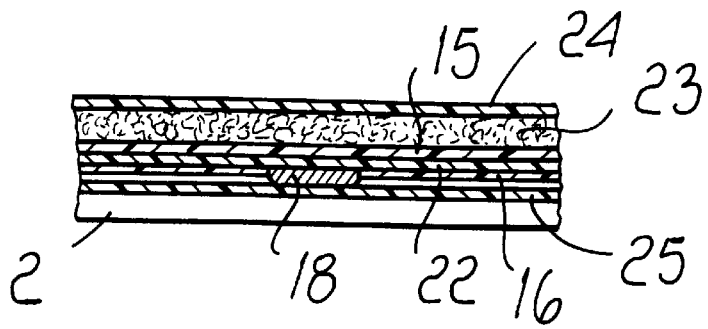
FIG. 3 is an enlarged-scale sectional view of a detail of FIG. 1.

The strip 6 has, at a free end, an electric contact 7 that faces a magnetic plate that is not shown in the drawings and is of a conventional type; the plate closes an external power supply circuit, of which the terminals 8 and 9 are shown in FIG. 2.

A worm-screw adjustment part 10 is provided on the opposite side of the support or frame 5 and longitudinally moves a movable pointer along a scale and forces a rocker, not shown in the drawings, to rotate; the rocker is meant to vary the inflection of the strip 6 and therefore the force required to separate it from the magnetic plate. At one end of the support 5 there is a plug 11 for closing the container. A knob 12 protrudes from this plug and is mounted on the axis of the screw 10 to allow a user to operate it.

Contacts 13 and 14 are provided at the opposite end of the support 5 to supply power to the heating component 4.

The outside wall of the thermostat 3 is slightly spaced from the internal surface of the casing 2 so as to leave, in the peripheral region, a space or gap that has an approximately torus-like shape.

According to the invention, the heating component 4 is mounted in a radially offset and longitudinally superimposed position with respect to the thermostat 3. Preferably, the lengths of the heating component 4 and of the thermostat 3 are the same as, or similar to, or slightly less than, the length of the container 2.

Conveniently, the heating component 4 is a resistive component that has an essentially laminar structure with a very low thickness. In particular, the resistive component is formed by an electrically insulating heat-resistant flexible laminar support 15 that is made for example of Mylar or Kevlar (Registered Trademarks) and is a few tenths of a millimeter thick; a layer 16 of an electrically resistive material is anchored to the support by virtue of the screen printing process that is normally used for printed circuits.

This material can preferably be a PTC ink of the type described in the Italian patent application No. VI94A000004 in the name of this same Applicant.

The layer 16, whose thickness is similar to, or lower than, the thickness of the support 15, is arranged in preset regions, for example so as to form bands 17 of appropriate width so as to form a certain number of resistors that are parallel-connected to electrically conducting paths 18 made of silver ink. The paths 18 have connectors 19 and 20 for connection to the terminals 13 and 14 of the thermostat.

In order to increase the sensitivity of the thermostat, the bands 17 are arranged so that they at least partially directly face, or are adjacent to, the sentitive part 6 of the thermostat, as clearly shown in FIG. 1.

The type of PTC ink and the size and number of the bands 17 are such that the maximum temperature that can be reached by the heating component never exceeds a maximum safety value, for example between 70° C. and 100° C., even in the absence of the external liquid to be heated. Accordingly, if the heater suddenly surfaces due to lack of water or to other accidental causes, it never burns the heating component and is also safer for users.

Figure 4:
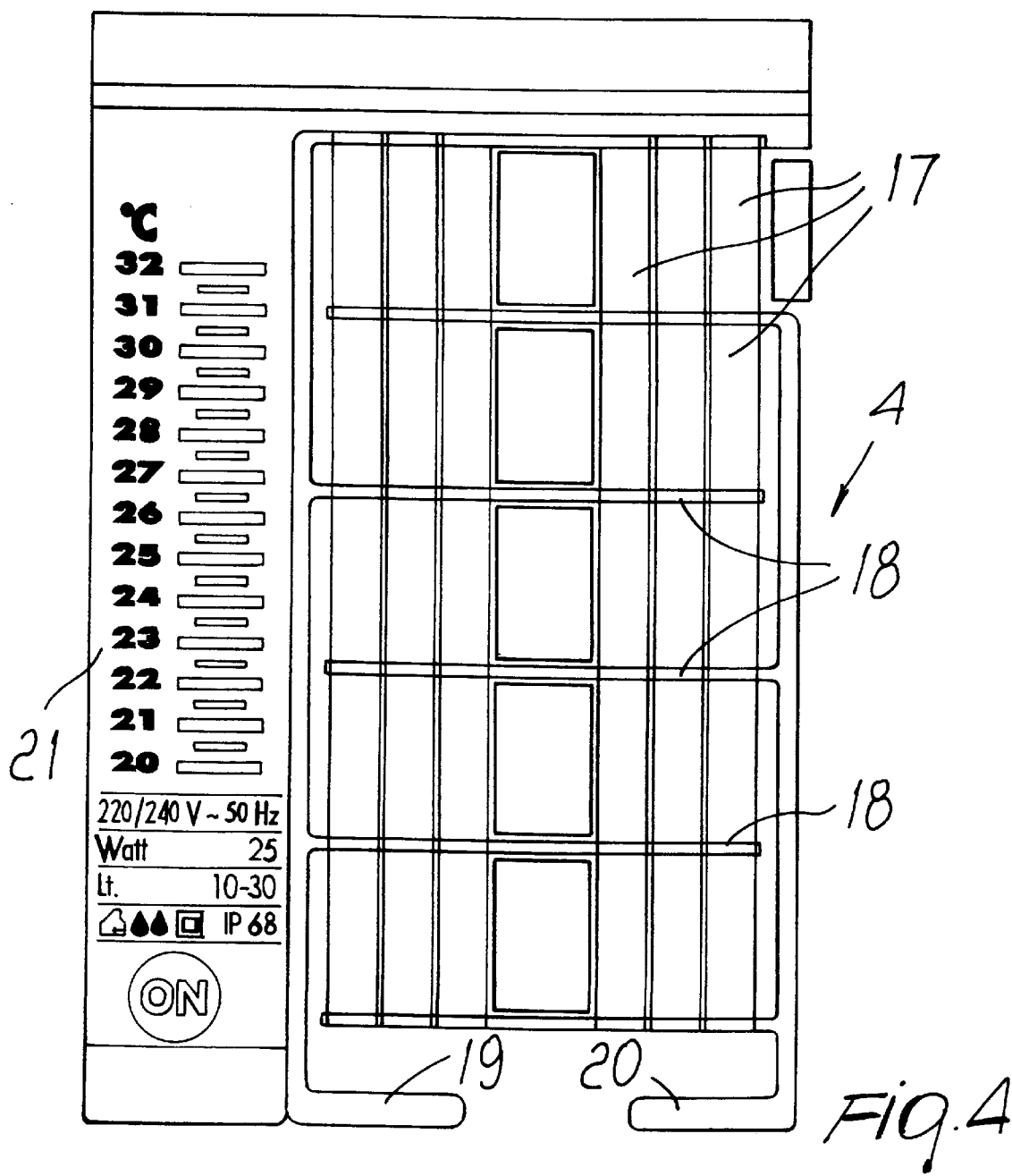
FIG. 4 is a plan view of a detail of FIG. 1.

Advantageously, a scale, optional data plate information, and identification markings of the heater, can be screen printed on at least one part of the layer 16 of PTC ink as shown in the region 21, which is on the left in FIG. 4. In this manner, it is possible to avoid using a specifically provided additional data plate, with an obvious reduction in manufacturing and assembly costs.

According to the invention, in order to prevent local increases in the temperature of the layer 16 of PTC ink, which would cause sudden increases in resistance and therefore further temperature increases, with a consequent avalanche effect causing overheating and burning of the layer, a backing layer 22 is deposited first on the support 15. This layer is made of a material that has high heat conductivity and is electrically insulating, and has the purpose of producing a uniform temperature distribution in the resistive layer 16 that is deposited thereon.

The basic material of the backing layer 22 can be chosen among beryllium oxide, silicon carbide, silicon in the elemental state, and others that have the same electrical and thermal behavior. As an alternative, it is possible to use a mix of these materials, with the addition of a synthetic resin that acts as binder. It is optionally possible to include this mix in the PTC ink itself instead of depositing it as a backing, avoiding an intermediate stratification.

Since the heating component 4 has a flexible laminar structure, it can be easily curled around the thermostat and can face the internal cylindrical surface of the container 2, so as to sharply increase the heat exchange coefficient and thus the general efficiency of the heater.

In order to further increase the heat exchange coefficient and thus reduce energy consumption, there is an elastic presser 23 that is interposed between the thermostat 3 and the heating component 4, so as to compress the latter radially outward against the internal surface of the container 2.

The presser 23 can be constituted by a layer or pad made of an elastomeric material such as polyurethane, preferably in the foamed state.

In order to better redistribute the pushing load, the presser 23 is rested against the outer lateral surface of the thermostat with the interposition of a first lamination 24 made at semirigid plastic, for example polyester, Mylar, (Refgiatered Trademark) or polyethylene.

Furthermore, a lamination 25 made of electrically insulating semirigid plastic is interposed between the heating component 4 and the internal wall of the container 2 and acts as electrical insulator.

This arrangement of course does not affect the outside diameter of the container 2, which indeed is not increased with respect to prior-art heaters also in order to improve conditions for contact between the heating component 4 and the inside wall of the container 2.

From the above it is evident that the heater according to the invention achieves the intended aim and objects and in particular that it is more compact, highly sensitive, cheaper, and safer.

We claim:

1. A compact immersion heater, particularly for aquariums, comprising a watertight tubular container that internally accommodates an electric heating component and a single thermostat, both of which extend longitudinally, an electric circuit for serially connecting said heating component and said thermostat to an external electric source, means for adjusting said thermostat from the outside of said tubular container, said heating component being a resistive component with an essentially laminar structure, characterized in that said heating component and said thermostat have substantially the same length that is at least a substantial portion of the length of said container, said heating component being arranged in a substantially torus-like gap formed between said thermostat and the inside surface of said container and being radially offset and longitudinally superimposed to said thermostat, said heating component being at least partially curled around said thermostat so as to face the inside cylindrical surface of said container.

2. Heater according to claim 1, characterized in that said resistive component comprises a layer of an electrically resistive material that is anchored to a flexible laminar support that is electrically insulating and heat-resistant.

3. Heater according to claim 2, characterized in that said layer of resistive material is a PTC ink, printed on said support in selected regions that are connected to conducting electric power supply paths.

4. Heater according to claim 3, characterized in that said regions are located so that they directly face, and are substantially adjacent to the sensitive part of said thermostat.

5. Heater according to claim 3, characterized in that said layer of electrically resistive material is sized so that the maximum outside temperature of the tubular container is constantly lower than a value between 70° C. and 100° C., even when the heater is partially or fully out of the medium to be heated.

6. Heater according to claim 3, characterized in that at least one part of said PTC ink has a pattern that is suitable to represent a graduated scale, optional data plate information, and identification markings of the heater.

7. Heater according to claim 3, characterized in that said layer of resistive material is deposited on a backing layer made of a material that has high thermal conductivity, said backing layer being electrically insulating, and being anchored beforehand to said support, in order to produce a uniform temperature distribution in said resistive layer.

8. Heater according to claim 7, characterized in that the basic material of said backing layer is taken from the group consisting essentially of beryllium oxide, silicon carbide, silicon in the elemental state and mixtures of beryllium oxide silicon carbide, and silicon in the elemental state.

9. Heater according to claim 3, characterized in that an elastic presser is interposed between said thermostat and said heating component so as to compress the latter radially outward against the internal surface of said container.

10. Heater according to claim 9, characterized in that said presser comprises a pad or layer of an elastomeric material such as polyurethane, preferably in the foamed state.

11. Heater according to claim 10, characterized in that said presser is located to rest on the outside lateral surface of said thermostat with the interposition of a first lamination made of a semirigid plastic material.

12. Heater according to claim 11, characterized in that said heating component rests on the inside surface of said casing with the interposition of a second lamination made of electrically insulating semirigid plastic material.

* * * * *